US009035759B2

(12) United States Patent
Wietfeld et al.

(10) Patent No.: US 9,035,759 B2
(45) Date of Patent: May 19, 2015

(54) APPROACH WARNING SYSTEM AND METHOD FOR DETECTING THE APPROACH OF MOVING OBJECTS

(75) Inventors: Christian Wietfeld, Dortmund (DE); Andreas Lewandowski, Dortmund (DE); Volker Koester, Dortmund (DE)

(73) Assignee: TECHNISCHE UNIVERSITAET DORTMUND, Dortmund (DE)

( * ) Notice: Subject to any disclaimer, the term of this patent is extended or adjusted under 35 U.S.C. 154(b) by 228 days.

(21) Appl. No.: 13/701,021

(22) PCT Filed: May 30, 2011

(86) PCT No.: PCT/EP2011/058846
§ 371 (c)(1),
(2), (4) Date: Mar. 7, 2013

(87) PCT Pub. No.: WO2011/151291
PCT Pub. Date: Dec. 8, 2011

(65) Prior Publication Data

US 2013/0176144 A1 Jul. 11, 2013

(30) Foreign Application Priority Data

May 31, 2010 (DE) ......................... 10 2010 022 282

(51) Int. Cl.
*B60Q 1/00* (2006.01)
*G08G 1/16* (2006.01)

(52) U.S. Cl.
CPC ................ *G08G 1/166* (2013.01); *G08G 1/161* (2013.01)

(58) Field of Classification Search
CPC ........... G08B 21/0202; G08B 21/0269; G08B 21/023; G08G 1/161; G08G 1/166
USPC ................. 340/435, 903, 944, 539.13, 573.4; 701/400, 408, 468, 538
See application file for complete search history.

(56) References Cited

U.S. PATENT DOCUMENTS

| | | | | |
|---|---|---|---|---|
| 6,181,253 | B1 * | 1/2001 | Eschenbach et al. | 340/573.4 |
| 2005/0073438 | A1 * | 4/2005 | Rodgers et al. | 340/944 |
| 2007/0146162 | A1 | 6/2007 | Tengler et al. | |
| 2011/0249118 | A1 * | 10/2011 | Bruno | 340/435 |
| 2012/0299713 | A1 * | 11/2012 | Elia et al. | 340/435 |

FOREIGN PATENT DOCUMENTS

DE 39 15 466 A1 12/1989

OTHER PUBLICATIONS

D. Anurag et al.: „GPS based Vehicular Collision Warning System using IEEE 802.15.4 MAC/PHY Standard, ITS Telecommunications, pp. 154-159 (Oct. 24, 2008).

(Continued)

*Primary Examiner* — Thomas Mullen
(74) *Attorney, Agent, or Firm* — Norman B. Thot

(57) ABSTRACT

An approach warning system includes at least one marking module and a warning module. The at least one marking module comprises a marking module transmission unit configured to emit electromagnetic signals, and a motion detector configured to detect a motion. The at least one marking module is configured to emit presence signals as the electromagnetic signals when a motion is detected. The warning module comprises a reception unit configured to receive the electromagnetic signals emitted by the at least one marking module, and an output device configured to emit an approach warning. The warning module is configured to emit the approach warning via the output device dependent on a reception of the presence signals emitted by the at least one marking module.

16 Claims, 9 Drawing Sheets

(56) References Cited

OTHER PUBLICATIONS

D. Jiang et al.: ,,Design of 5.9 GHz DSRC-based Vehicular Safety Communication, IEEE Wireless Communications, vol. 13, No. 5, pp. 36-43, (Oct. 1, 2006).

S.-Y. Wang et al.: ,,SAA 02-4—A Vehicle Collision Warning System Employing Vehicle-to-infrastructure Communications, Wireless Communications and Networking Conference, pp. 3075-3080 (Mar. 31, 2008).

* cited by examiner

APPROACH WARNING SYSTEM AND METHOD FOR DETECTING THE APPROACH OF MOVING OBJECTS

CROSS REFERENCE TO PRIOR APPLICATIONS

This application is a U.S. National Phase application under 35 U.S.C. §371 of International Application No. PCT/EP2011/058846, filed on May 30, 2011 and which claims benefit to German Patent Application No. 10 2010 022 282.8, filed on May 31, 2010. The International Application was published in German on Dec. 8, 2011 as WO 2011/151291 A1 under PCT Article 21(2).

FIELD

The present invention relates to an approach warning system and to a method for recognizing the approach of moving objects, particularly of persons, and to a vehicle with such an approach warning system.

BACKGROUND

The early recognition of moving objects such as persons, domestic animals, farm animals, wild animals, play equipment or also bicycles by drivers of vehicles is an essential perquisite for reducing the number of accidents which occur as a result of vehicles colliding with such moving objects. This applies both to the involvement of the moving objects and vehicles in public road traffic and to the operation of vehicles in private grounds which are additionally visited by moving objects. Particularly in construction sites, in agriculture, in industrial installations and in logistical centers, serious accidents repeatedly occur because drivers of vehicles overlook moving objects in the surroundings of the vehicles on account of blind spots and other visual obstructions, for example, as a result of obstacles. The risk of collisions is particularly high in the case of large vehicles with poor visibility, for example, harvesters, construction machines and the like.

Measures available today for reducing the risk of accidents in the aforementioned cases are based primarily on increasing the visibility of the moving objects, for example, by attaching reflectors. It is thus customary today to carry high visibility vests in motor vehicles. Vehicles use additional means to provide the drivers of the vehicles with a better view of possible moving objects, for example, additional mirrors, particularly for blind spots, or else cameras on the vehicles, for example, in the form of rear-view cameras. These solutions are all visual solutions based on a visual link between the moving object and the vehicle. It is therefore not possible to protect moving objects which enter the field of view of the vehicle at short range, for example, when the moving objects come out from behind an obstacle. These measures on the vehicles also require complex situations which have associated high costs. In the case of poor visual conditions, for example, due to fog or rain, these measures come to nothing to some extent and are ineffective. The same restrictions and problems affect assistance systems introduced into motor vehicles today which automatically sense the surroundings using radar or by means of cameras.

DE 39 15 466 A1 describes a method for taking up and performing regulated radio operation for the prevention of collisions between vehicles. In this case, all the vehicles continuously ascertain location data and transmit them to other vehicles by means of electromagnetic signals. A disadvantage of this is that these systems are also very complex and have a high power consumption under continuous operation. A localization infrastructure is also required which the vehicles can use to recognize their location, with the result that this method can be performed only in areas with special equipment.

SUMMARY

An aspect of the present invention is to provide an approach warning system and a method for recognizing the approach of objects of any kind to a vehicle which are suitable for mobile use, have a simple and inexpensive design, and allow a use at any location.

In an embodiment, the present invention provides an approach warning system which includes at least one marking module and a warning module. The at least one marking module comprises a marking module transmission unit configured to emit electromagnetic signals, and a motion detector configured to detect a motion. The at least one marking module is configured to emit presence signals as the electromagnetic signals when a motion is detected. The warning module comprises a reception unit configured to receive the electromagnetic signals emitted by the at least one marking module, and an output device configured to emit an approach warning. The warning module is configured to emit the approach warning via the output device dependent on a reception of the presence signals emitted by the at least one marking module.

BRIEF DESCRIPTION OF THE DRAWINGS

The present invention is described in greater detail below on the basis of embodiments and of the drawings in which.

DETAILED DESCRIPTION

Figure 1:
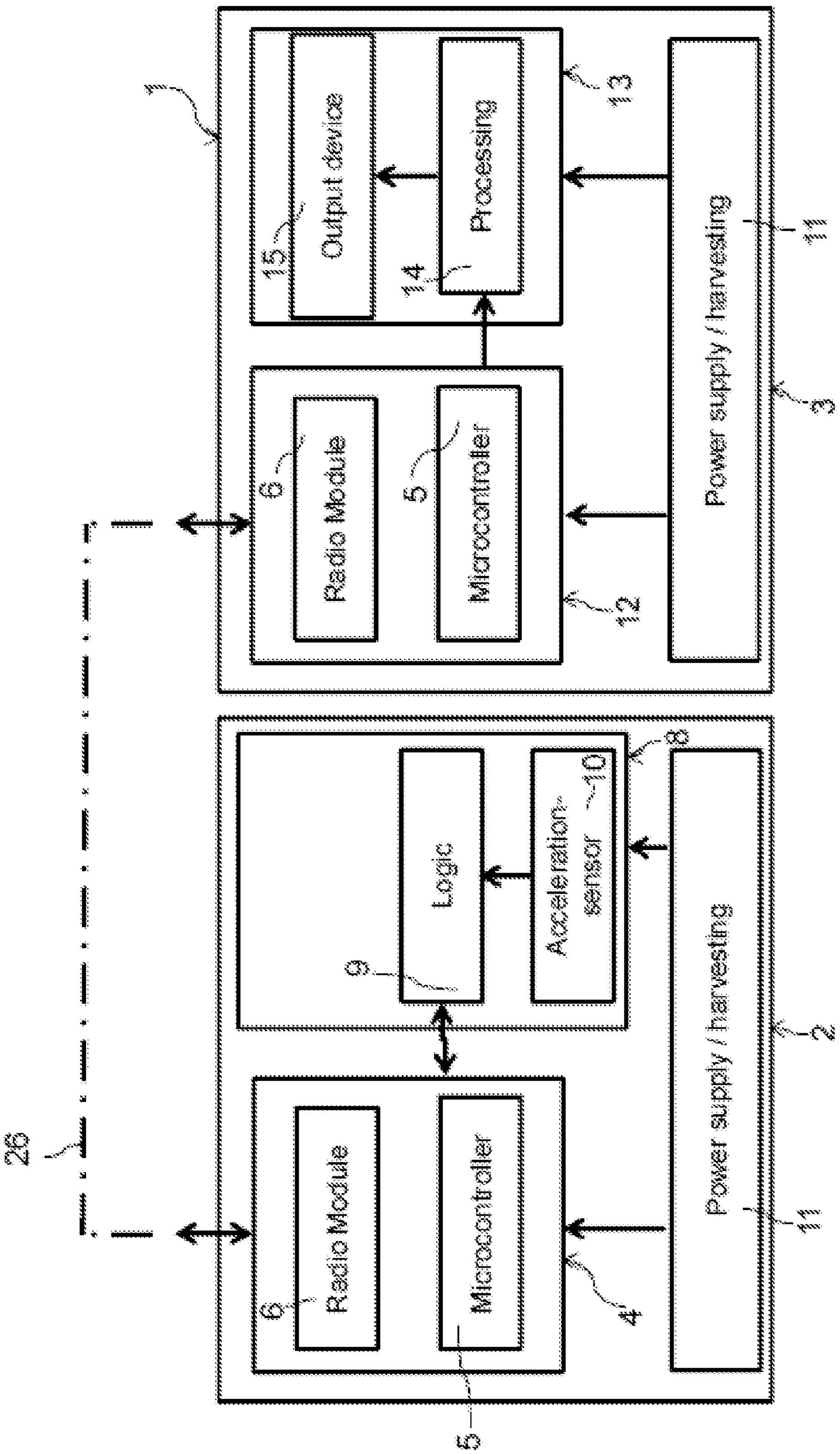
FIG. 1 shows an approach system based on an embodiment of the present invention with a marking module and a warning module, each in a schematic view.

In an embodiment, the present invention provides an approach warning system having a warning module and at least one marking module, wherein the marking module comprises a transmission unit for emitting electromagnetic signals and a motion detector and is designed to emit presence signals as electromagnetic signals when a motion is detected, and the warning module comprises a reception unit for the electromagnetic signals radiated by the marking module and an output device and is designed to take the reception of the presence signals radiated by the marking module as a basis for outputting an approach warning via the output device.

The present invention also provides a method for recognizing the approach of moving objects, particularly of persons, to a vehicle with an approach warning system as specified above, wherein each moving object has a marking module, and the vehicle has a warning module.

The fundamental idea of the present invention is to combine the use of radio transmission of the presence signals from the marking module to the warning module to provide that the approach is recognized independently of the presence of a visual link. The propagation of the radio waves avoids blind spots or shadowing by obstacles in the field of view of the warning module, with the result that safety is increased compared with visual approach warning systems. At the same time, the effect achieved by the use of the motion detector is that the marking module sends presence signals only when a motion by the marking module is detected. The effect of this is that the marking module has a low power consumption and achieves a long operating time. The transmission unit of the marking module for emitting electromagnetic signals may, in principle, be designed on the basis of any standard or else may be of proprietary design. It may be designed to emit digital, analog electromagnetic signals which are radiated continuously or as pulses on the basis of an arbitrary transmission scheme. The reception unit of the warning module is of correspondingly compatible design to receive the electromagnetic signals from the marking module. The marking and warning modules can each have a dedicated transmission and reception unit exclusively for transmitting the presence signals, or the transmission and reception units are in the form of a universal transmission and reception unit for transmitting arbitrary data between arbitrary subscribers. The reception unit of the warning module may also be designed to receive update information for a software update or an alteration in the configuration of the warning module. Advantageously, it is possible to vary the transmission and/or reception level of the marking module and of the warning module. This allows the range for transmitting the presence signals, and thereby initiating the approach warning, to be configured. The transmission and reception units can, for example, be combined with one another in the manner of a mesh or ad-hoc network, with the result that the presence signals can be transmitted without prior configuration of the transmission and reception unit. The motion detector is designed such that it detects the presence of a motion by the marking module. The motion detector can, for example, be designed as an impact sensor which detects vibrations associated with motions. It is also possible to use more complex motion detectors which, for example, detect an absolute change in position.

The simple design of the warning module means that it is well suited for retrofitting in existing vehicles. Advantageously, the warning module is an appliance which can be used independently in the vehicle, with the result that it is not necessary to fit the warning module into the vehicle. Alternatively or additionally, in the case of vehicles which have a dedicated electrical power supply, the warning module may have connecting means to connect the latter to the power supply of the respective vehicle. This allows the operating time of the warning module to be extended. By way of example, a connection to a cigarette lighter that is customary in motor vehicles allows the warning module to be connected to a 12-volt or possibly 24-volt onboard power supply system. In addition, it is possible for vehicles to be designed to be directly integral with such a warning module. It is thus possible to attune the warning module to the respective vehicle, for example, to achieve the best possible reception of the presence signals and to provide a supply of power to the warning module by means of a power supply in the vehicle. The warning module can be integrated into the vehicle directly during production or by retrofitting. The low power consumption of the marking module means that it is well suited to being designed as a mobile appliance with an electrical energy store. The low power consumption means that the energy store may be a small design, which means that the marking module has a low weight and a small size overall. The marking module can therefore be easily carried by the moving objects, particularly persons or animals. In order to implement the use of the marking module on the moving object, the marking module may be designed as a neckband, with the result that it can be worn around the neck by a person or an animal. It is also possible for the marking module to be designed as an armband, for example, as a strap of a watch. For use in roadworks or the like, it can also be integrated into a hard hat. The marking module can also be integrated into items of clothing, bags, accessories or play equipment to achieve automatic protection of a user or wearer of these articles thereby. Children's toys can be designed to have such a marking module so as to automatically protect children at play. Such children's items include, for example, scooters, tricycles, bicycles or school backpacks.

The marking module and/or the warning module may comprise a display apparatus which indicates the operating state of the respective module. As a result, it is possible to signal to a carrier or user of the respective module that he is no longer protected by the relevant module, and to prompt him to replace the module or the relevant power supply.

The output device may be designed as a visual, audible and/or haptic output device. The type of output device can be chosen on the basis of the purpose of use in the vehicle, with the result that in surroundings with a high noise level, for example, a visual and/or haptic output device can, for example, be present in the warning module or used by configuration, whereas in vehicles which require complex operation, for example, the use of an audible warning unit may be used. The type of the approach warning may be of arbitrary design, one simple form of the approach warning being output of a signal when a marking module is present in a reception radius of the warning module. The output device may be designed to indicate a mere presence of a marking module in the reception range of the warning module, or to indicate the number of marking modules in the reception range, or to output each marking module individually by means of a separate signal on the basis of position. By way of example, the position of individual marking modules around the warning module can be displayed in the manner of a radar screen. It is also possible to combine the warning module with a map view, with the result that the position of each marking module can be indicated directly in the map view. It is also possible to integrate the warning module into mobile appliances such as mobile telephones, laptops or the like to use the output devices thereof.

In an embodiment of the present invention, the motion detector comprises an acceleration sensor. The acceleration sensor is suitable for recognizing an alteration in the position of the marking module. The motion detector may be designed to detect the presence of an acceleration as an indication of a motion. The acceleration sensor is simple to implement and is an inexpensive type of detection of a motion.

In an embodiment of the present invention, the motion detector is designed to sense a type, speed, direction and/or alteration of the motion. To this end, the motion detector may be designed to have an acceleration sensor and can perform an evaluation of the acceleration values provided by the acceleration sensor. Alternative embodiments for determining the motion parameters are likewise possible. By way of example, the listed motion parameters can be used to influence the emission of the presence signals. This means that presence signals are emitted in altered form on the basis of these parameters, for example, in terms of the frequentness of said presence signals, the transmission power used, the frequencies used, or the like.

In an embodiment of the present invention, the warning module comprises a transmission unit for emitting electromagnetic signals and is designed to emit trigger signals as electromagnetic signals, and the marking module comprises a reception unit for the electromagnetic signals radiated by the warning module and is designed to emit presence signals on the basis of the reception of trigger signals. The trigger signals are firstly a piece of information for the marking module stating that a warning module and an associated vehicle are present in the relatively close environment around the marking module, with the result that an appropriate warning signal can also be output on the marking module. This allows the attentiveness of a carrier of the marking module to be increased, which produces an additional protection effect. Secondly, the trigger signal can be used to influence the emission of the presence signals. When trigger signals are received, it is explicitly possible to initiate the emission of a presence signal, or the reception of trigger signals is used to influence the frequentness of the emission of presence signals. In this context, it is particularly possible to take account of parameters of the received trigger signal, such as a signal strength for the received signal, time of arrival (ToA) information, frequency information or the like. In an embodiment of the present invention, the marking module can, for example, be designed to emit the presence signals as a direct response to the reception of the trigger signals from the warning module. In accordance with this embodiment, the marking module and the warning module are designed to perform a polling method. For example, when there has already been a substantial approach to the warning module, the marking module is prompted to send the presence signals with increased frequentness, so that the warning module can update the approach warning at a high frequency.

In an embodiment of the present invention, the warning module and/or the marking module comprise/comprises a power generation unit for converting kinetic energy into electrical power. The period of use of the marking module and/or of the warning module can accordingly be increased without the need for maintenance in the form of charging or replacement of the energy store or of the entire marking module and/or the warning module. Such power generation units are known in the art, which means that further details in this regard are not discussed. These techniques are also called energy harvesting. If the marking module is being carried by a pedestrian, for example, the motion through the individual steps means that energy pulses of mechanical type are obtained which are easily converted into electrical power. This principle is also known from wristwatches.

In an embodiment of the present invention, the marking module is designed to transmit information about the motion sensed by the motion detector with the presence signals. The motion information comprises a type, speed, direction and/or alteration of the motion and can be transmitted explicitly in the presence signal. In this case, the transmission of motion parameters can replace an explicit presence signal. Implicit transmission by unaltered presence signals is also possible, for example, by virtue of the frequency of the emission of the presence signals being altered on the basis of the speed. The warning module can process the motion information further to influence the initiation or the type of the approach warning.

In an embodiment of the present invention, the warning module comprises a processing unit and is designed to process the received presence signal to determine motion and/or position parameters for the marking module and to output the approach warning by taking account of the motion and/or position parameters of the marking module. To this end, the marking module can transmit motion and/or position parameters that it has sensed itself, for example, with or instead of the presence signal, so that the warning module can output the approach warning on the basis of these parameters for the marking module. By way of example, if the marking module is at high speed, an approach warning can be produced even when the marking module is at a relatively great distance from the warning module. Furthermore, a possible reaction by a person who is carrying a marking module can be sensed, for example, if the speed of the marking module is reduced and the marking module is therefore established to be slowing down or stopping.

In an embodiment of the present invention, the processing unit is designed to process radio parameters from the received presence signal to determine motion and/or position parameters for the marking module. Such radio parameters comprise information relating to signal delay Time of Arrival (ToA), the received signal strength Received Signal Strength Indicator (RSSI), the transmission frequency, a channel number used, modulation types, a frequentness with which presence signals are emitted or the like, from which information about the motion or the position of the marking module can be derived directly or indirectly. It is also possible to perform locating methods, for example using a plurality of connected antennas, so as to determine a position for the marking module by this means.

In an embodiment of the present invention, the warning module can comprise a calibration data memory to sense motion and/or position parameters for the marking module by taking account of calibration data stored in the calibration data memory. There may also be various calibration data records stored in the memory, which means that they can be quickly activated on the basis of the use of the warning module, for example, when a warning module is intended to be used in different vehicles. The calibration can take account of specific propagation characteristics of the electromagnetic signals which arise, for example, through the use of the warning module on different vehicles. Large construction machines are, for example, predominantly made from metal and therefore shield the electromagnetic signals to some extent. The irregular shape of these vehicles means that electromagnetic signals from equidistant marking modules for different radio parameters can be received on the warning module.

In an embodiment of the present invention, the warning module is designed to modify and/or augment the calibration data with a learning function. By way of example, an acknowledgement can be provided via a UI on the warning module if an approach warning has not been output at all, has been output by mistake or has been output at an incorrect time.

In an embodiment of the present invention, the warning module comprises an advance calculation unit which is designed to perform an advance calculation for the approach of the marking module to the warning module from the motion and/or position parameters and to output the approach warning by taking account of the advance calculation of the approach of the marking module to the warning module. Such methods are known in the prior art, for example, as pattern recognition methods, such that they are not discussed herein in detail. The warning module can produce the approach warning on the basis of whether a further approach is being made or is probable, or even a possible collision is taking place. By contrast, even a rapid motion by the marking module is harmless when it is moving away from the warning module.

In an embodiment of the present invention, the marking module comprises an identification device for producing identification information and is designed to transmit the identification information from its identification device with the presence signals, and the warning module is designed to output the approach warning by taking account of the identification information. The identification device may be of arbitrary design, in principle, and comprises a user interface for inputting the identification. This user interface may be designed as a DIP switch, an electronic configuration interface, a fingerprint reader, as a keypad for inputting an identification number, or as a card reader for reading particular data cards or else an identity card. By way of example, the user interface may be implemented with RFID technology to allow the marking module to automatically read the identification information from an appropriate RFID chip. The identification information can therefore be automatically read as soon as the respective module is carried by a person with an identity card. By way of example, the identification of the carrier of the marking module allows its age to be established to identify children who are particularly easy to overlook on account of their small size and to initiate an approach warning in correspondingly good time.

In an embodiment of the present invention, the warning module and the marking module comprise an identification device for producing identification information, the marking module is designed to transmit the identification information from its identification device with the presence signals, and the warning module is designed to perform a comparison of the identification information transmitted with the presence signals with the identification information from its identification device and to output the approach warning by taking account of the comparison. By way of example, this allows the use of a standard module as a warning module or as a marking module by virtue of said module being provided with an appropriate identification. It is therefore necessary to keep only one type of module. The comparison of the identification information also makes it possible to establish when a warning module and a marking module in the vicinity have the same identification. In that case, it can be assumed that the carrier of the marking module is acting as the vehicle driver of a vehicle which has a warning module, for example, and an appropriate approach warning can be deactivated for the marking module with the same identification. The identification device may be of arbitrary design, in principle, and comprises a user interface for inputting the identification. This user interface may be designed as a fingerprint reader, as a keypad for inputting an identification number, or as a card reader for reading particular data cards or else an identity card. By way of example, the user interface may be implemented with RFID technology to allow the marking module to automatically read the identification information from an appropriate RFID chip. It is thus possible for the identification information to be read automatically as soon as the respective module is carried by a person with an identity card.

In an embodiment of the present invention, the approach warning system is designed such that the marking module is associated with a class from a plurality of classes and is designed to emit the presence signal with a piece of information about its associated class, and the warning module is designed to output the approach warning by taking account of the class of the marking module. The class may be permanently associated with the marking module, for example, when the marking module is integrated in an article such as a children's toy, a bicycle, an item of clothing for a person or a vehicle, or can be implemented dynamically, for example, when the motion detector is used to establish that the type of movement is a walking motion. Automatic association by means of the identification information is also possible. The various classes may have corresponding particular hazard potentials, for example, as a result of a high or low speed that is implicit in a class or a size of the moving object with which the marking module is associated. Hence, in an exemplary class for small children, a different approach warning can be output and/or the approach warning can be output in particularly good time in comparison with a class for adults. It is also possible to take account of the classes for the advance calculation of the motion of the marking module. By way of example, only relatively small changes of direction can be expected in the case of motor vehicles in comparison with pedestrians.

In an embodiment of the present invention, the transmission unit and the reception unit are designed to radiate and receive electromagnetic signals on the basis of IEEE 802.15.4. The IEEE 802.15.4 standard is also known by WPAN and operates in the free 2.4 GHz band, for which reason it is possible to use the approach warning system based on WPAN at any location without prior licensing. WPAN is also distinguished by a low power consumption, which means that particularly marking modules with a long operating time can be provided.

The transmission unit and the reception unit can, for example, be designed to perform adaptive frequency matching to provide that the present signals and possibly the trigger signals are transmitted. To this end, the warning module can perform signal strength measurements on various frequencies, for example, and, when a marking module approaches, can transmit a preferred frequency for the transmission of the presence and/or trigger signals to said marking module. Transmission methods using frequency hopping are also possible.

In an embodiment of the present invention, the warning module comprises a sensing device to sense a motion and/or position of the warning module and is designed to output the approach warning by taking account of its own motion and/or position. The motion and/or position of the warning module can be used to calculate the probability of a further approach by marking modules in advance, as has already been explained previously. Position information can also be used to sense preferred paths of motion for the warning module and/or for the marking module, for example, by means of the combination with map data, and to take account of said preferred paths of motion for the approach warning. In the case of vehicles in road traffic, for example, it is assumed that they move predominantly on roads and do not make any motion prompting the vehicles to leave the road. By way of example, it is possible to combine the warning module with a GPS receiver, with the result that the position of each marking module can be displayed directly in a map view provided by the GPS receiver.

In an embodiment of the present invention, a plurality of marking modules are provided, and the warning module is designed to output the approach warning for each marking module individually via the output device. By way of example, the individual marking modules can be marked individually on a screen, with the result that the vehicle designed to have the warning module can safely be steered through the marking modules.

Warning and marking modules are each produced so as to be replaceable, in principle. In construction sites, for example, it is therefore possible to equip a plurality of vehicles with warning modules of the same type and to protect each person by means of a marking module such that the person produces an approach warning when he approaches any vehicle in the construction sites. Advantageously, in such a system, a marking module is additionally provided for each vehicle with a warning module to warn vehicles with warning modules not only about persons who are carrying exclusively marking modules when they approach but rather also about other vehicles with both modules.

Figure 2:
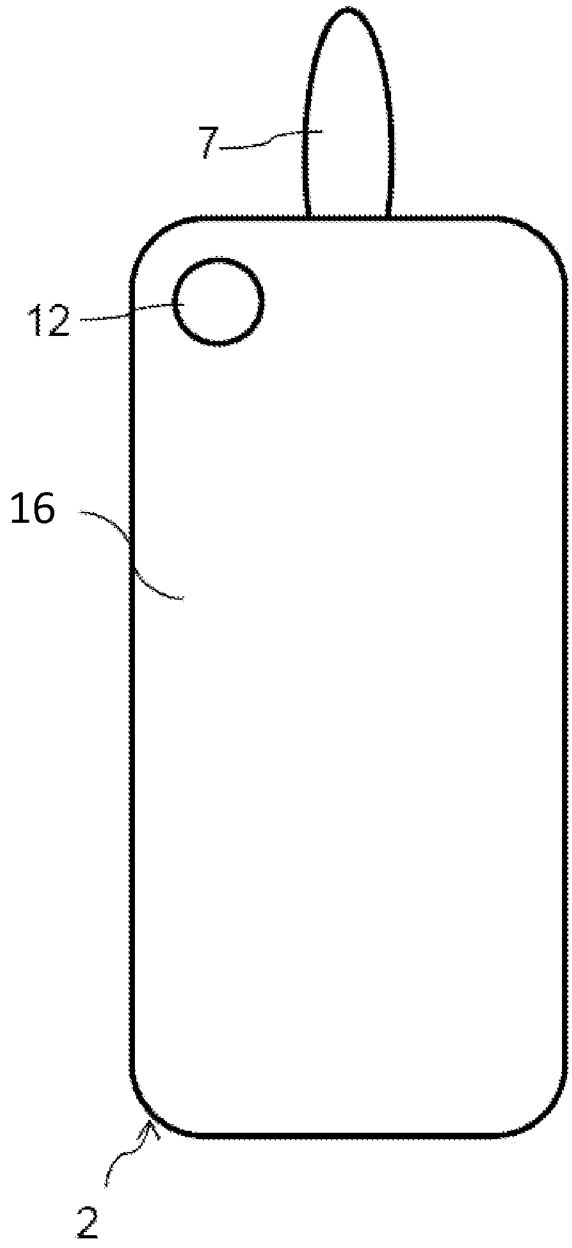
FIG. 2 shows a marking module based on an embodiment of the present invention as a terminal with a housing and an antenna in plan view.

FIG. 1 shows an approach warning system 1 based on an embodiment of the present invention with a marking module 2 and a warning module 3. The marking module 2, which is also shown in FIG. 2, comprises a transmission unit 4 which, in this exemplary embodiment, is designed as a system on a chip (SoC). The transmission unit 4 comprises a microcontroller 5 and a radio module 6 which are connected to an antenna 7 of the marking module 2. The microcontroller 5 performs coding of data which are sent by means of the radio module 6.

In addition, the marking module 2 comprises a functional unit 8 with a logic unit 9, which is designed as a microprocessor, and a motion detector 10, which is designed as an acceleration sensor. The marking module 2 also comprises a power supply device 11 with an integrated power harnessing device which practices energy harvesting and converts mechanical kinetic energy into electrical power. If the marking module is being carried by a pedestrian, for example, the motion through the individual steps means that energy pulses of mechanical type are obtained which are easily converted into electrical power. This principle is also known from wristwatches. The power supply device 11 is connected to the transmission unit 4 and to the functional unit 8 and provides electrical power for the operation thereof. The power supply device 11 has an LED electrically connected to it in a manner which is not shown, said LED being positioned in a housing 16 of the marking module 2 and being designed to indicate a charge state of an energy store in the power supply device 11.

The warning module 3 comprises a reception unit 12 which, in this exemplary embodiment, is designed as a system on a chip (SoC) in accordance with the transmission unit 4 of the marking module 2. Accordingly, the reception unit 12 likewise comprises a microcontroller 5 and a radio module 6. In this case, the microcontroller 5 is designed to decode data which are received via the radio module 6. The reception unit 12 and the transmission unit 4 therefore differ only by their use.

The warning module 3 also comprises a power supply device 11, as has likewise already been described with reference to the marking module 2.

The warning module 3 comprises a warning device 13 with a processing unit 14, which is designed as a microprocessor, and an output device 15.

Figure 3:
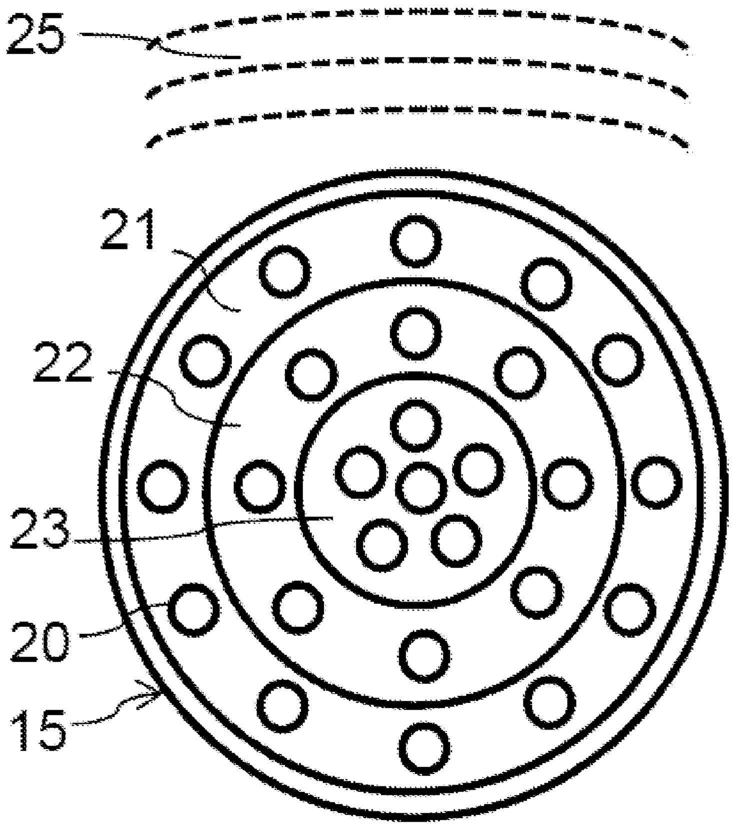
FIG. 3 shows an output device of the warning module with three warning areas in plan view.
Figure 4:
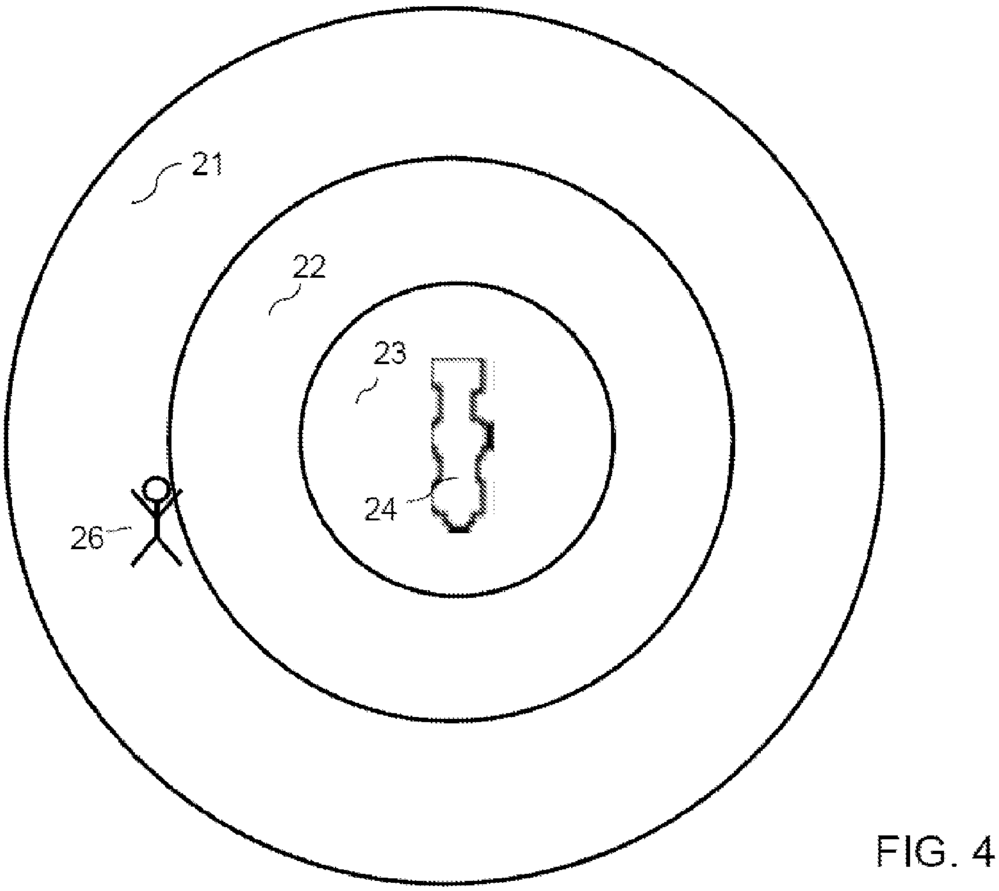
FIG. 4 shows a schematic view of a vehicle with a warning module and warning areas arranged thereon.

FIG. 3 shows the output device 15 in detail. The output device 15 comprises a plurality of LEDs 20 which are arranged in three warning areas 21, 22, 23. The warning areas 21, 22, 23 are arranged in concentric rings, with the outer ring representing an outer warning area 21, the middle ring representing a middle warning area 22 and the inner ring representing an inner warning area 23. A vehicle 24 in which the warning module 3 is positioned forms the center of the warning areas 21, 22, 23, as shown in FIG. 4. In addition, the output device 15 comprises an audible warning device, which is not shown separately, and is indicated by sound waves 25 which are shown in this case.

The warning module 3 and the marking module 2 are designed to use a radio link 26 to communicate with one another and to transmit electromagnetic signals.

The operation of the approach warning system 1 will now be described with reference to FIGS. 5-7.

The warning module 3 of the approach system 1 is mounted on the vehicle 24 shown in FIG. 4. The warning module 3 is activated as soon as the vehicle 24 is started. To this end, the vehicle 24 is electrically connected to the warning module 3 in a manner which is not shown here. The warning module 3 is supplied with power via this electrical connection.

The marking module 2 is mounted on a moving object 27. In this exemplary embodiment, the moving object 27 is a person, as indicated in FIG. 4. The marking module 2 has no operating switch and is more or less constantly in an activated state. As soon as the motion detector 10 of the marking module 2 detects a motion, the logic unit 9 will emit a presence message via the transmission unit 4 and the antenna 7. The marking module 2 is designed to use the logic unit 9 to evaluate signals received from the motion detector 10 such that more presence messages are sent when frequent motion is detected by the motion detector 10.

Figure 6:
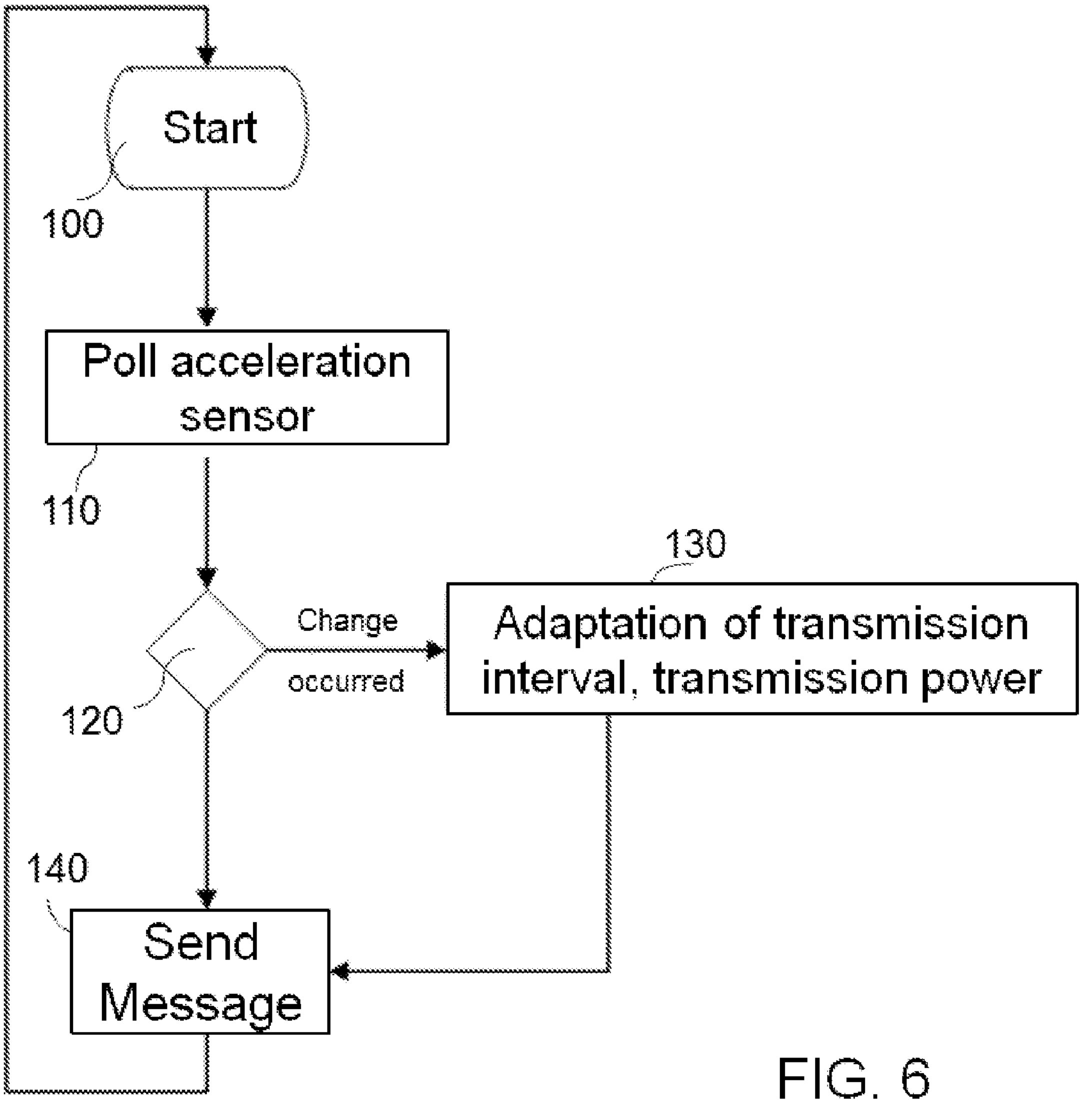
FIG. 6 shows an exemplary operating state chart for a marking module.

FIG. 6 shows a corresponding operating state chart by way of example. In the chart in FIG. 6, the processing begins at the start 100.

In the next step 110, the motion detector 10 is polled by the logic unit 9.

In the subsequent step 120, a check is performed to determine whether a change in the motion has occurred. Since the motion detector 10 is an acceleration sensor in this case, a check is performed to determine whether the acceleration has changed. If a change has occurred, the process transfers to step 130, otherwise it transfers to 140.

In state 130, the transmission interval and the transmission power of the presence messages are adapted. If acceleration is taking place, the transmission interval is shortened and the transmission power for emitting the presence messages is raised. In the event of a reduction in the speed, the transmission interval and the transmission power are adapted conversely as appropriate. The processing continues in step 140.

In step 140, a message based on the currently stipulated values for the transmission interval and the transmission power is sent. This includes a waiting period being added in step 140 until the transmission interval for sending the next presence message has been reached.

Figure 7:
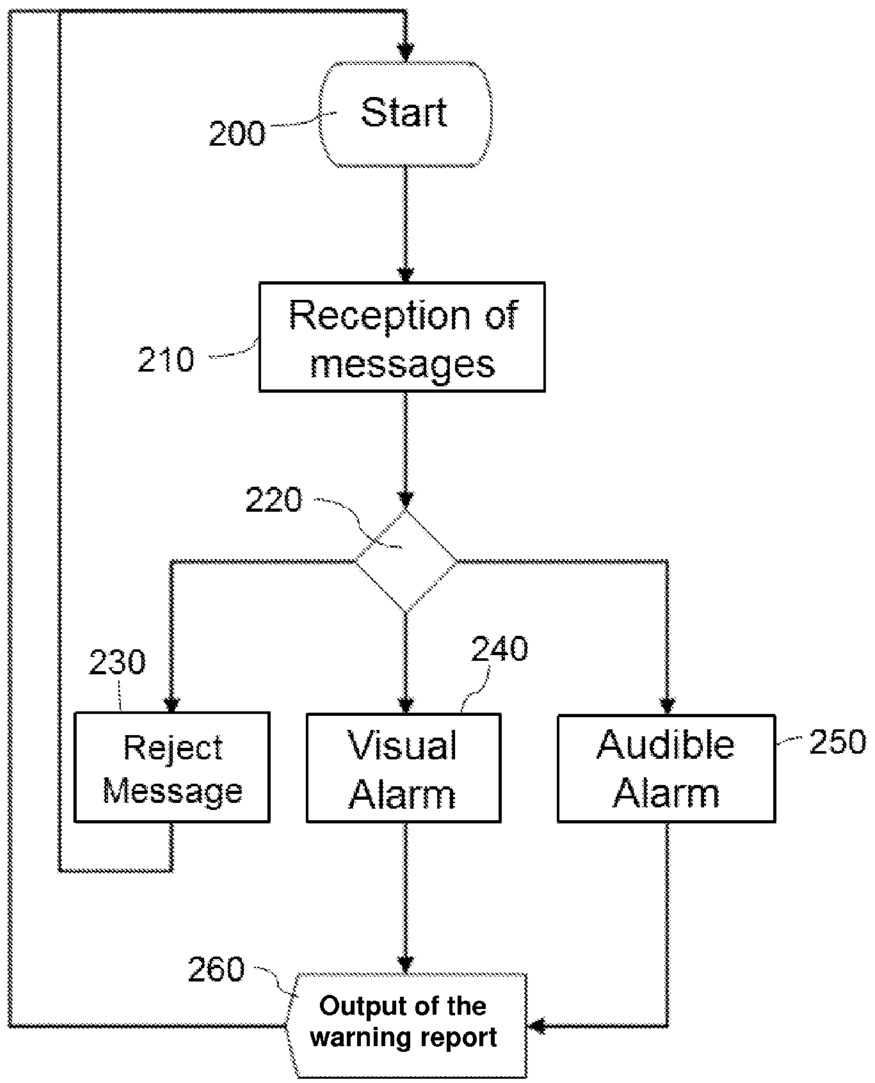
FIG. 7 shows an exemplary operating state chart for a warning module.

FIG. 7 shows an exemplary operating state chart for the warning module 3.

The processing begins in step 200, which is defined as a starting point for the operating state chart.

In step 210, a presence message is received from the marking module 2. The received presence message is processed in respect of radio parameters Received Single Strength Indicator (RSSI), Time of Arrival (ToA), transmission frequency, and is analyzed in the processing unit 14. The received presence signal is also compared in the processing unit 14 with the time of the previous presence signal from the marking module 2 in respect of the frequentness of the presence signals to determine the frequency of the emission of the presence signals. The processing unit 14 of the warning module 3 then performs further processing of the aforementioned information to determine a distance between the marking module 2 and the warning module 3. The distances are classified into categories which match the warning areas 21, 22, 23. Furthermore, a plausibility check on the received presence signal is performed.

In step 220, a result from the processing of the information in the processing unit 14 is taken as a basis for branching to step 230, 240 or 250. In step 230, the received presence signal is rejected. This is because, in this case, the result of the plausibility check yields the result that the presence signal need not be processed. The process returns to the start 200.

In step 240, the output device 15 is used to produce a visual approach warning. On the basis of the ascertained distance between the marking module 2 and the warning module 3, the LEDs 20 of the relevant warning area 21, 22, 23 are selected for activation. This is followed by step 260.

In the event of an approach in the inner warning area 23, an audible alarm is initiated if an additional limit (not shown here) is transgressed. The output device 15 is accordingly configured in step 250 to use the audible warning unit to initiate an audible alarm. This is followed by step 260.

In step 260, the approach alarm is output. This relates both to the visual alarm as per step 240 and to the audible alarm as per step 250. The audible and visual alarms can be produced by the output device 15 simultaneously. This is followed by a return to the start 200.

Figure 5:
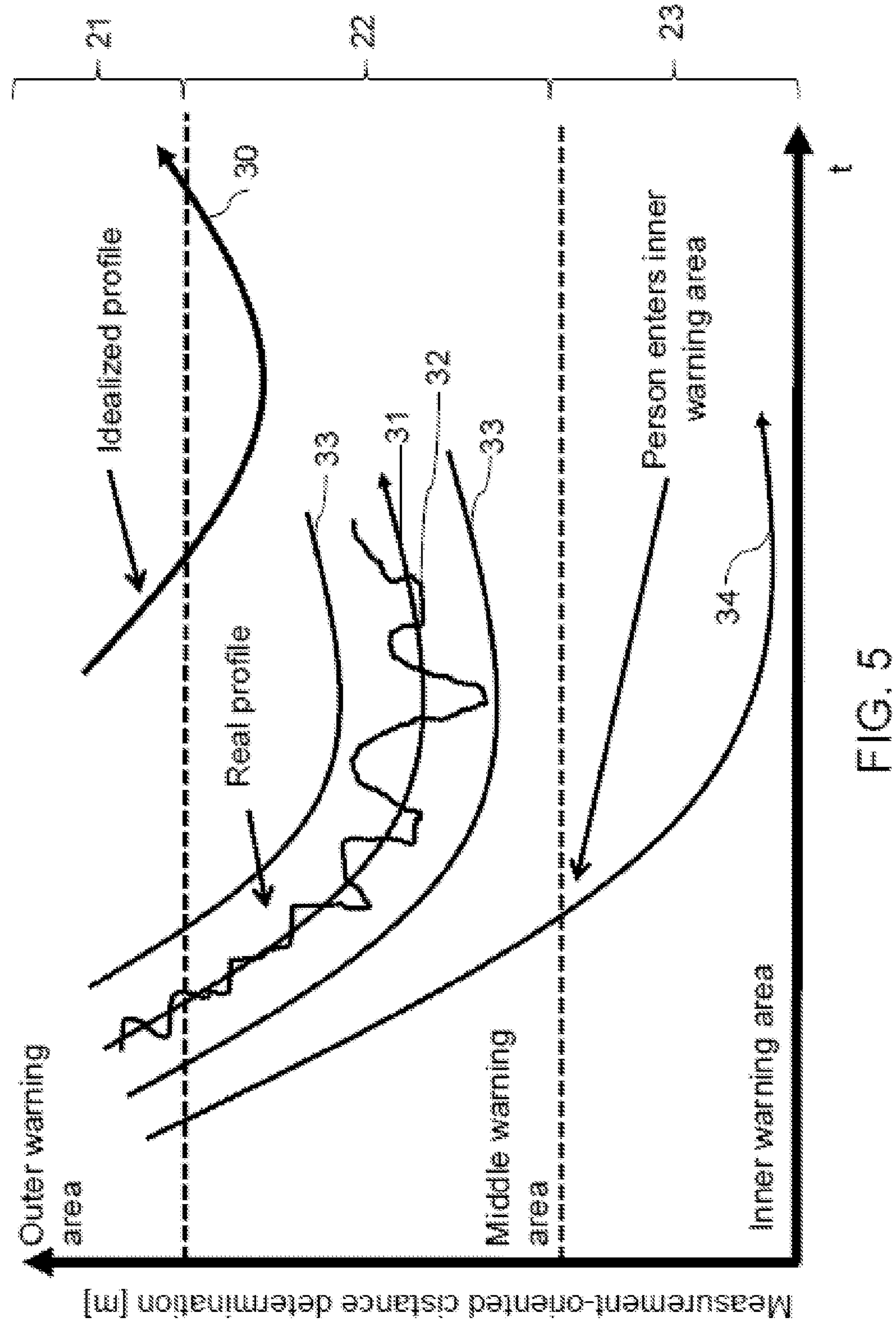
FIG. 5 shows an illustration of various motion sequences when a marking module approaches a warning module.

FIG. 5 shows an exemplary profile of various approach scenarios. On the basis of an idealized profile 30, the marking module 3 approaches the outer warning area 21, whereupon a visual approach warning, as described previously with reference to step 240 in FIG. 7, is initiated. A driver of the vehicle 24 then takes countermeasures to prevent the marking module 2 from approaching the warning module 3 further. The curve 30 therefore shows that the marking module 2 is again moving away from the warning module 3.

On the basis of reaction and delay times, a real profile 31 involves a greater approach to the warning module 3 by the marking module 2. The real profile 31 is a smoothed curve, with a profile 32 showing the distances sensed by the processing unit 14. Nonideal transfer ratios by means of the radio transmission 26 produce the profile 32 shown. Accordingly, a tolerance range which defines a range for plausible values is shown within lines 33. When the processing unit 14 ascertains a distance value which is outside the tolerance range, the measurement is rejected as implausible, as described in step 230.

The graph 34 shows a profile for an approach by the marking module 2 to the warning module 3 such that it enters a critical area. As soon as the distance between the marking module 2 and the warning module 3 reaches the outer warning area 21, the middle warning area 22 or the inner warning area 23, an appropriate visual alarm is produced on the warning module 3 with the output device 15 as described in step 240. In addition, a further approach, as described in step 250, prompts an audible alert by means of the audible output unit of the output device 15. Accordingly, an approach by the marking module 2 to the warning module 3 up to collision can be prevented as per graph 34.

Figure 8:
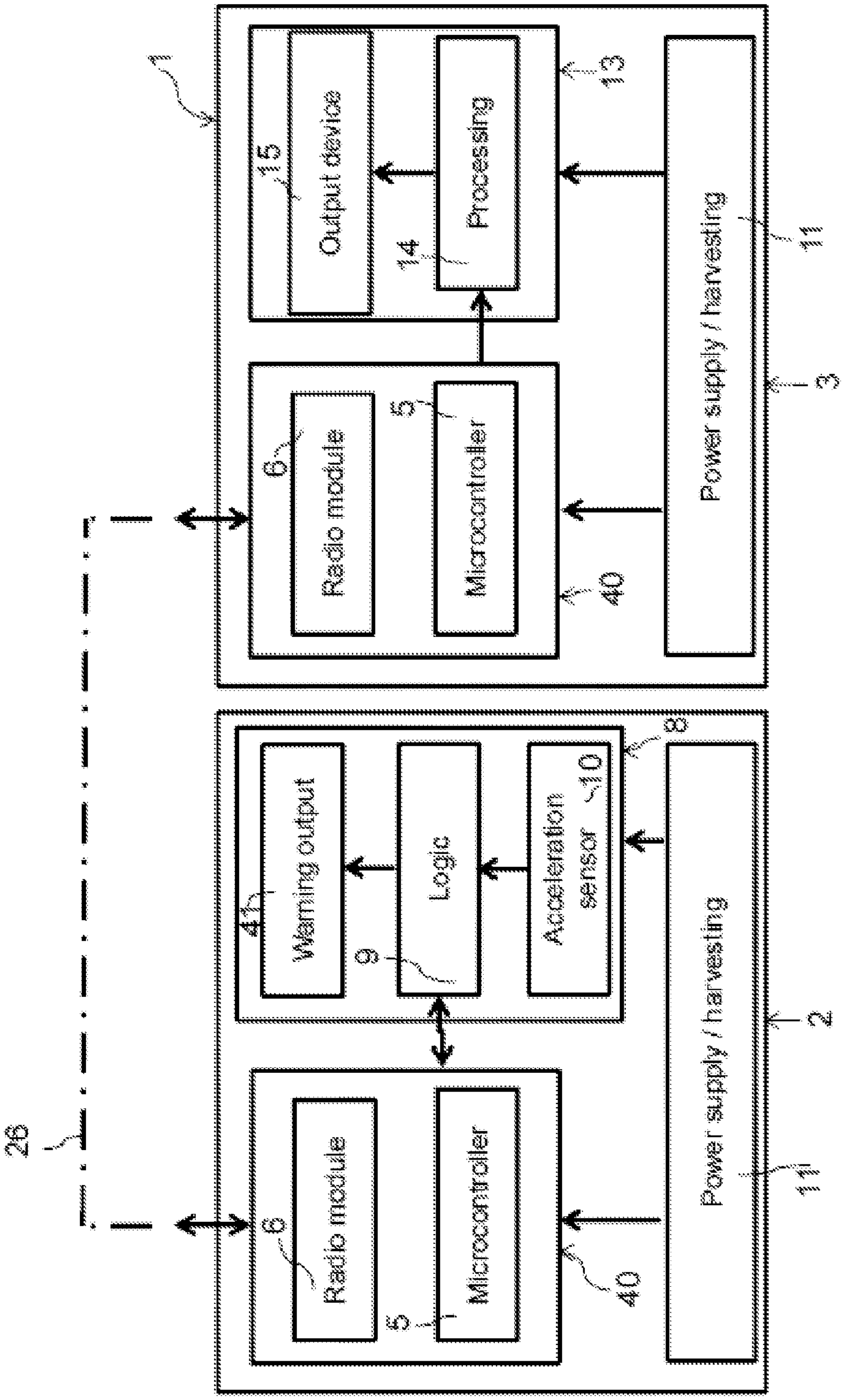
FIG. 8 shows an approach system based on an embodiment of the present invention with a marking module and a warning module, each in a schematic view.
Figure 9:
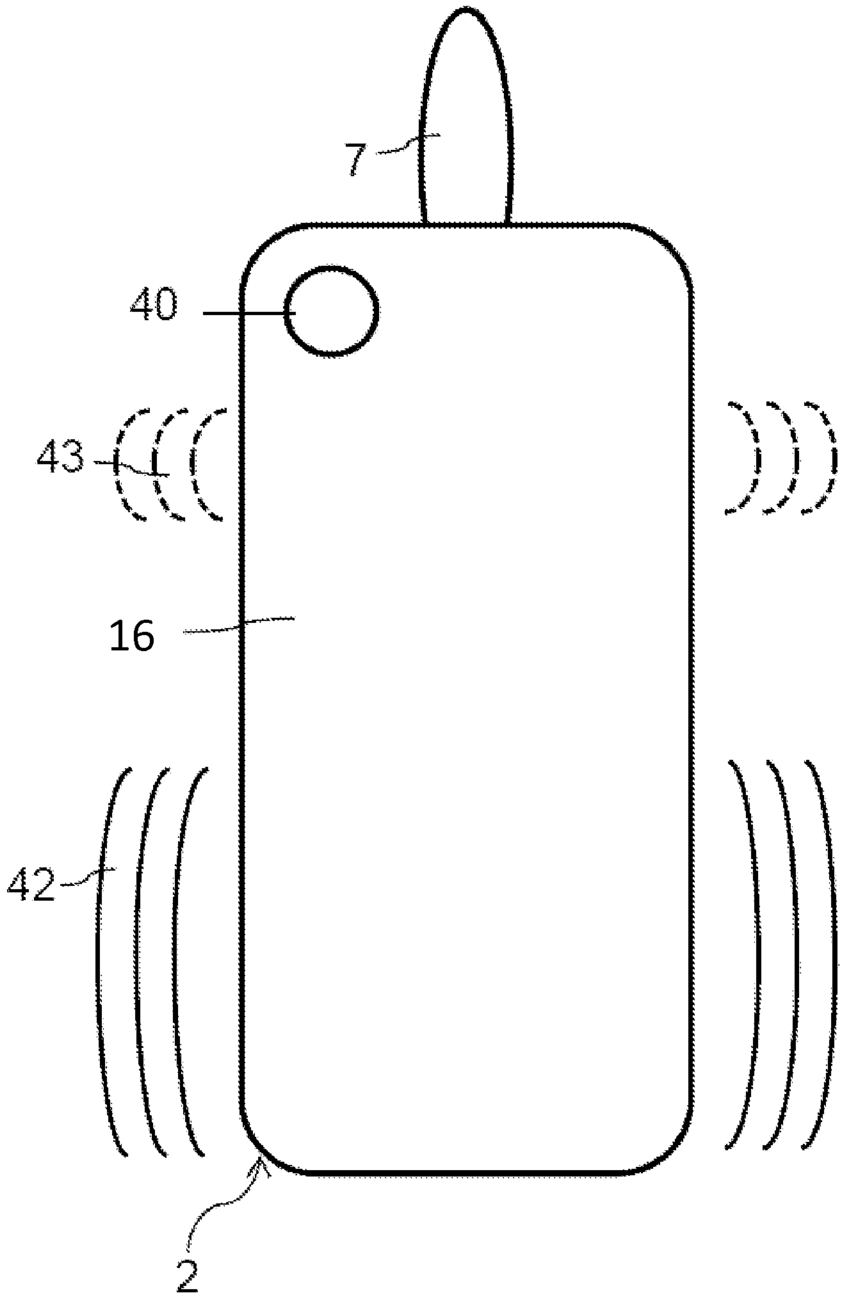
FIG. 9 shows a marking module based on an embodiment of the present invention as a terminal with a housing and an antenna in plan view.

An embodiment of the present invention will now be described with reference to FIGS. 8 and 9. Since this embodiment is essentially identical to the preceding one, only differences are described.

In the embodiment of the present invention, the marking module 2 and the warning module 3 comprise a transmission and reception unit 40 instead of the transmission unit 4 and the reception unit 12. As described previously, the transmission and reception unit 40 comprises a microcontroller 5, which is designed for coding and decoding data, and a radio module 6 for emitting and receiving electromagnetic signals. The transmission and reception unit 40 is supplied with electrical power by means of the power supply device 11.

The functional unit 8 of the marking module 2 also comprises a warning output unit 41. The warning output unit 41 comprises a vibration device (not shown in detail) and an audible output device. The vibration device is indicated by mechanical vibrations 42 which are shown in FIG. 9, and the audible warning device is indicated by sound waves 43 which are likewise shown in FIG. 9.

The warning module 3 is designed to send trigger signals during operation. As soon as a trigger signal is received by the marking module 2, emission of the presence signals is additionally triggered. In addition, the logic unit 9 of the marking module 2 produces a warning output in the warning output unit 41. In this case, the warning output unit 41 is actuated by the logic unit 9 on the basis of radio parameters in a similar manner to the previously described output of the approach warning via the output device 15 of the warning module, with the result that firstly an audible alarm is initiated upon an approach and additionally a vibration alarm is initiated upon further approach. Accordingly, both the driver of the vehicle 24 and the person who is carrying the marking module 2 as a moving object 27 take countermeasures to prevent the marking module 2 from further approaching the warning module 3. This allows a further reduction in the probability of the vehicle 24 colliding with the moving object 27.

The present invention is not limited to embodiments described herein; reference should be had to the appended claims.

What is claimed is:

1. An approach warning system comprising:
- at least one marking module comprising:
  - a marking module transmission unit configured to emit electromagnetic signals, and
  - a motion detector configured to detect a motion,
  - wherein the at least one marking module is configured to emit presence signals as the electromagnetic signals when a motion is detected; and
- a warning module comprising:
  - a reception unit configured to receive the electromagnetic signals emitted by the at least one marking module, and
  - an output device configured to emit an approach warning,
  - wherein the warning module is configured emit the approach warning via the output device dependent on a reception of the presence signals emitted by the at least one marking module.

2. The approach warning system as recited in claim 1, wherein the motion detector comprises an acceleration sensor.

3. The approach warning system as recited in claim 1, wherein the motion the motion detector is configured to detect is at least one of a motion type, a motion speed, a motion direction and a motion alteration.

4. The approach warning system as recited in claim 1, wherein,
- the warning module further comprises a warning module transmission unit configured to emit the electromagnetic signals, the warning module being further configured to emit trigger signals as the electromagnetic signals, and
- the at least one marking module further comprises a reception unit for the electromagnetic signals emitted by the warning module, the at least one marking module being further configured to emit the presence signals dependent on a reception of the trigger signals.

5. The approach warning system as recited in claim 1, wherein at least one of the warning module and the at least one marking module further comprise(s) a power generation unit configured to convert kinetic energy into electrical power.

6. The approach warning system as recited in claim 1, wherein the at least one marking module is further configured to transmit information with the presence signals relating to the motion detected by the motion detector.

7. The approach warning system as recited in claim 1, wherein the warning module further comprises a processing unit configured to process the presence signals received so as to determine at least one of a motion parameter and a position parameter of the at least one marking module, and to emit the approach warning in response to the at least one of a motion parameter and a position parameter.

8. The approach warning system as recited in claim 7, wherein the processing unit is further configured to process a radio parameter of the presence signals received so as to determine the at least one motion parameter and position parameter.

9. The approach warning system as recited in claim 7, wherein the warning module further comprises an advance calculation unit configured to perform an advance calculation for an approach of the at least one marking module to the warning module from the at least one motion parameter and position parameter, and to emit the approach warning in response to the advance calculation.

10. The approach warning system as recited in claim 1 wherein, the warning module further comprises a warning module identification device and the at least one marking module further comprises a marking module identification device, the warning module identification device and the marking module identification device each being configured to produce identification information, the at least one marking module is further configured to transmit the identification information from the marking module identification device with the presence signals, and the warning module is further configured to perform a comparison of the identification information transmitted with the presence signals and the identification information from the warning module identification device and to emit the approach warning in response to the comparison.

11. The approach warning system as recited in claim 1, wherein, the at least one marking module is associated with a specific class from a plurality of classes, and the at least one marking module is further configured to emit the presence signal with information on the specific class, and the warning module is further configured to emit the approach warning in response to the specific class.

12. The approach warning system as recited in claim 1, wherein the marking module transmission unit is configured to emit the electromagnetic signals in a free frequency band and the reception unit is configured to receive the electromagnetic signals based in the free frequency band.

13. The approach warning system as recited in claim 1, wherein the warning module further comprises a sensing device configured to sense at least one of a motion and a position of the warning module, the warning module being further configured to emit the approach warning in response to the at least one of the motion and the position.

14. The approach warning system as recited in claim 1, wherein, a plurality of marking modules are provided, and the warning module is configured to emit the approach warning for each of the plurality of marking modules individually via the output device.

15. A method for recognizing an approach of a moving object to a vehicle using an approach warning system, the method comprising:

1) providing an approach warning system comprising:
   at least one marking module comprising:
      a marking module transmission unit configured to emit electromagnetic signals, and
      a motion detector configured to detect a motion,
      wherein the at least one marking module is configured to emit presence signals as the electromagnetic signals when a motion is detected, and
   a warning module comprising:
      a reception unit configured to receive the electromagnetic signals emitted by the at least one marking module, and
      an output device configured to emit an approach warning,
      wherein the warning module is configured emit the approach warning via the output device dependent on a reception of the presence signals emitted by the at least one marking module,
2) providing the moving object comprising the at least one marking module;
3) providing the vehicle comprising the warning module; and
4) using the approach warning system to recognize the approach of the moving object to the vehicle.

16. The method as recited in claim 15, wherein the moving object is a person.

* * * * *